(12) United States Patent
Weber

(10) Patent No.: US 9,589,558 B2
(45) Date of Patent: *Mar. 7, 2017

(54) MOTOR VEHICLE NOISE MANAGEMENT

(71) Applicant: Bose Corporation, Framingham, MA (US)

(72) Inventor: Martin Amandus Weber, Esslingen a.N. (DE)

(73) Assignee: Bose Corporation, Framingham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/859,324

(22) Filed: Sep. 20, 2015

(65) Prior Publication Data

US 2016/0012814 A1    Jan. 14, 2016

Related U.S. Application Data

(63) Continuation of application No. 13/767,540, filed on Feb. 14, 2013, now Pat. No. 9,167,067.

(51) Int. Cl.
*H04M 1/00* (2006.01)
*G10K 11/175* (2006.01)
(Continued)

(52) U.S. Cl.
CPC .......... *G10K 11/175* (2013.01); *G10K 11/178* (2013.01); *H04M 1/6091* (2013.01); *G10K 2210/1282* (2013.01)

(58) Field of Classification Search
CPC ............. H04M 1/6075; H04M 1/6091; H04M 2250/74; G01K 11/178; G01K 11/1788; G01K 2210/1282

(Continued)

(56) References Cited

U.S. PATENT DOCUMENTS

| 4,944,018 A | 7/1990 | Bose et al. |
| 5,034,984 A | 7/1991 | Bose |

(Continued)

FOREIGN PATENT DOCUMENTS

| JP | 2011152820 A | 8/2011 |
| JP | 20121361244 A | 7/2012 |
| WO | 20120162182 A1 | 11/2012 |

OTHER PUBLICATIONS

Wikipedia article entitled "Active Noise Control", printed from hppt://en.wikipedia.org/wiki/Active_Noise_Control cancellation on Dec. 30, 2015.

(Continued)

*Primary Examiner* — Simon Nguyen
(74) *Attorney, Agent, or Firm* — Brian M. Dingman; Dingman IP Law, PC

(57) ABSTRACT

A device and method that is configured to control the operation of a motor vehicle cabin active sound management (ASM) system that uses an ASM controller to control operation of one or more sound transducers that transmit audio signals in the cabin so as to alter vehicle powertrain-related sounds in the cabin, wherein the motor vehicle further comprises a mobile telephone system that is configured to receive incoming mobile telephone calls and transmit outgoing mobile telephone calls. The device can include a controller that is configured to receive from the mobile telephone system an indication that a mobile telephone call is incoming or an outgoing call is being initiated. After receiving the indication, the subject controller commands the ASM controller to cause operation of one or more sound transducers such that the level of vehicle powertrain-related sounds in the cabin is reduced.

13 Claims, 1 Drawing Sheet

(51) Int. Cl.
*H04M 1/60* (2006.01)
*G10K 11/178* (2006.01)

(58) Field of Classification Search
USPC .................... 455/67.1, 569.1–569.2, 570
See application file for complete search history.

(56) References Cited

U.S. PATENT DOCUMENTS

| | | | |
|---|---|---|---|
| 5,146,505 A | 9/1992 | Pfaff et al. | |
| 5,410,606 A | 4/1995 | Imai et al. | |
| 5,434,922 A | 7/1995 | Miller et al. | |
| 5,615,270 A | 3/1997 | Miller et al. | |
| 5,809,152 A * | 9/1998 | Nakamura | G10K 11/178 381/71.1 |
| 5,903,819 A * | 5/1999 | Romesburg | G10K 11/1788 375/285 |
| 7,171,003 B1 * | 1/2007 | Venkatesh | H04M 9/082 381/66 |
| 8,194,873 B2 | 6/2012 | Pan et al. | |
| 8,195,093 B2 | 6/2012 | Garrett et al. | |
| 8,204,242 B2 | 6/2012 | Pan et al. | |
| 8,230,581 B1 | 7/2012 | Wilcoxon et al. | |
| 8,244,307 B1 | 8/2012 | Tilgner et al. | |
| 8,280,073 B2 | 10/2012 | Ganeshkumar et al. | |
| 8,306,240 B2 | 11/2012 | Pan et al. | |
| 8,320,581 B2 | 11/2012 | Hera et al. | |
| 2002/0168071 A1 * | 11/2002 | Daly | G10K 11/1788 381/71.4 |
| 2005/0156753 A1 * | 7/2005 | DeLine | B60R 1/12 340/693.5 |
| 2005/0207585 A1 * | 9/2005 | Christoph | G10K 11/1788 381/71.11 |
| 2006/0023890 A1 | 2/2006 | Kaminuma | |
| 2007/0140503 A1 * | 6/2007 | Sakamoto | G10K 11/178 381/71.4 |
| 2007/0297619 A1 | 12/2007 | Pan | |
| 2009/0156203 A1 | 6/2009 | Himmelstein | |
| 2009/0292528 A1 | 11/2009 | Kameyama | |
| 2010/0035663 A1 | 2/2010 | Haulick et al. | |
| 2010/0041443 A1 | 2/2010 | Yokota | |
| 2010/0098263 A1 | 4/2010 | Pan et al. | |
| 2010/0113104 A1 | 5/2010 | Kirigaya | |
| 2010/0239105 A1 | 9/2010 | Pan | |
| 2011/0216916 A1 | 9/2011 | Hera et al. | |
| 2012/0101611 A1 * | 4/2012 | Inoue | G10K 15/02 700/94 |
| 2012/0121103 A1 | 5/2012 | Cohen et al. | |
| 2012/0172087 A1 | 7/2012 | Varela et al. | |
| 2012/0177214 A1 | 7/2012 | Hera et al. | |
| 2012/0197637 A1 | 8/2012 | Gratke et al. | |
| 2013/0090932 A1 * | 4/2013 | Miyazaki | G10L 21/028 704/275 |
| 2013/0130671 A1 * | 5/2013 | Kleinstueck | H04W 4/008 455/418 |
| 2013/0185078 A1 * | 7/2013 | Tzirkel-Hancock | G10L 15/22 704/275 |
| 2013/0260692 A1 | 10/2013 | Hera | |
| 2014/0094228 A1 * | 4/2014 | Hamelink | H04M 1/6091 455/569.2 |
| 2014/0177866 A1 | 6/2014 | Peachey et al. | |

OTHER PUBLICATIONS

International Search Report for corresponding PCT Application No. PCT/US2014/013873 mailed on Apr. 17, 2014.
Written Opinion of the International Searching Authority for corresponding PCT Application No. PCT/US2014/013873 mailed on Apr. 17, 2014.
International Preliminary Report on Patentability and Written Opinion of the International Searching Authority for corresponding PCT Application No. PCT/US2014/013873 issued on Aug. 18, 2015.

* cited by examiner

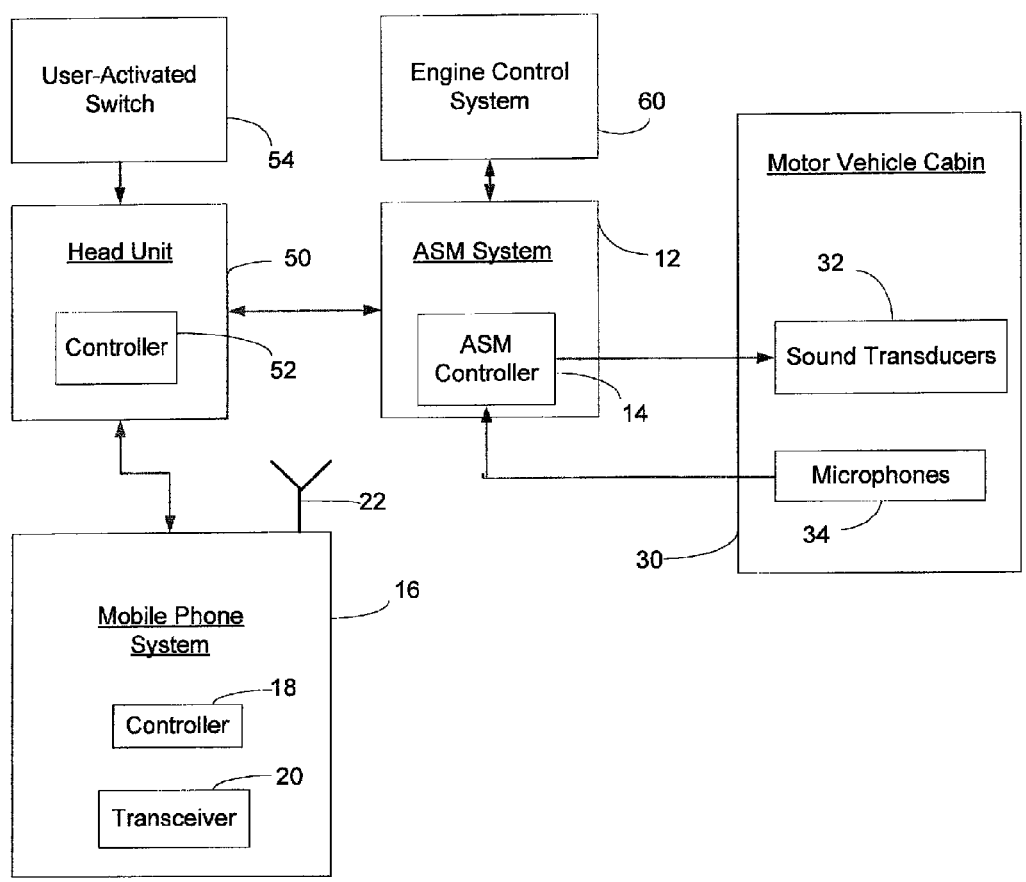

MOTOR VEHICLE NOISE MANAGEMENT

CROSS-REFERENCE TO RELATED APPLICATION

This application claims priority of U.S. patent application Ser. No. 13/767,540 filed on Feb. 14, 2013.

FIELD

This disclosure relates to the management of noise in a motor vehicle.

BACKGROUND

Many motor vehicles include hands-free mobile telephone systems that are enabled to receive and transmit mobile telephone calls using microphones and loudspeakers in the vehicle cabin along with appropriate user controls. Motor vehicles may also include active sound management systems to alter engine-related sounds in the vehicle cabin. These systems can be used to reduce or cancel powertrain sounds (e.g., engine harmonics) and/or enhance engine harmonics.

SUMMARY

Active sound management (ASM) systems for motor vehicles are used to manage powertrain-related sounds. One type of ASM system is an engine harmonic cancellation (EHC) system that uses the vehicle's audio system to produce a signal that is acoustically opposite to undesirable engine sounds in order to reduce such sounds. Another type of ASM system is an engine harmonic enhancement (EHE) system that uses information from the engine and the vehicle to generate signals that enhance or modify the spectrum of select powertrain sounds, e.g., to provide smooth or sporty powertrain sounds inside the cabin. In the present disclosure, a controller (which is typically but not necessarily part of the audio head unit) is configured such that when a mobile telephone call is being made or received the subject controller commands the existing motor vehicle ASM system controller to cause operation of in-cabin transducers such that the level of powertrain-related sounds in the cabin is reduced. This quiets the cabin and so makes the telephone call easier to conduct. When the subject controller is used along with an EHC system, the controller can be configured to turn on the EHC system when a phone call is initiated or received. Or, the controller can be configured to change the cancellation target of an active EHC system when a call is initiated or received, so as to reduce the noise. This noise reduction can in some cases be limited to a focal seating position. When the subject controller is used along with an EHE system, when a telephone call is initiated or received the subject controller is configured to turn off the EHE system or reduce the level of sound put out by the EHE system.

This disclosure features a device that is configured to control the operation of a motor vehicle cabin active sound management (ASM) system that uses an ASM controller to control operation of one or more sound transducers that transmit audio signals in the cabin so as to alter vehicle powertrain-related sounds in the cabin, wherein the motor vehicle further comprises a mobile telephone system that is configured to receive incoming mobile telephone calls and transmit outgoing mobile telephone calls. The device can include a controller that is configured to receive from the mobile telephone system an indication that a mobile telephone call is incoming or an outgoing call is being initiated. After receiving the indication the subject controller commands the ASM controller to cause operation of one or more sound transducers such that the level of vehicle powertrain-related sounds in the cabin is reduced.

The subject controller can be part of a motor vehicle audio head unit. The ASM system can be used to reduce engine harmonics sounds in the cabin, and the subject controller can be configured to command the ASM controller to cause the sound transducers to reduce engine harmonics sounds in the cabin. The subject controller can also be configured to receive an indication that a user desires to quiet the cabin and in response command the ASM controller to cause the sound transducers to reduce engine harmonics sounds in the cabin. The indication that a user desires to quiet the cabin can emanate from a user-controlled switch. The ASM system can be responsive to an engine control system that provides to the ASM system an input signal that is related to a rotation of the engine. As one non-limiting example the input signal can be related to the engine revolutions per minute (RPM).

In cases where the motor vehicle cabin has a plurality of seating locations the controller can be configured to command the ASM controller to cause the sound transducers to reduce engine harmonics sounds at one such seating location, which can be but need not be the driver's seat. The ASM system may be used to enhance engine harmonics sounds in the cabin, and the subject controller may be configured to command the ASM controller to cause the sound transducers to reduce or eliminate enhanced engine harmonics sounds.

The disclosure also features a method for controlling the operation of a motor vehicle cabin active sound management (ASM) system that uses an ASM controller to control operation of one or more sound transducers that transmit audio signals in the cabin so as to alter vehicle powertrain-related sounds in the cabin, wherein the motor vehicle further comprises a mobile telephone system that is configured to receive incoming mobile telephone calls and transmit outgoing mobile telephone calls. The method contemplates receiving from the mobile telephone system an indication that a mobile telephone call is incoming or an outgoing call is being initiated. After receiving the indication, the ASM controller is commanded to cause operation of one or more sound transducers such that the level of vehicle powertrain-related sounds in the cabin is reduced.

The subject controller can be part of a motor vehicle audio head unit. The ASM system can be used to reduce engine harmonics sounds in the cabin, and the ASM controller can be commanded to cause the sound transducers to reduce engine harmonics sounds in the cabin. The method can include receiving an indication that a user desires to quiet the cabin and in response commanding the ASM controller to cause the sound transducers to reduce engine harmonics sounds in the cabin. The indication that a user desires to quiet the cabin can emanate from a user-controlled switch. The ASM system may be responsive to an engine control system that provides to the ASM system an input signal that is related to a rotation of the engine. As a non-limiting example the input signal may be related to the engine revolutions per minute (RPM).

In situations where the motor vehicle cabin has a number of seating locations the ASM controller can be commanded to cause the sound transducers to reduce engine harmonics sounds at one such seating location. The one seating location may be but need not be the driver's seat. The ASM system can be used to enhance engine harmonics sounds in the cabin, in which case the ASM controller can be commanded to cause the sound transducers to reduce or eliminate the engine harmonics sound enhancement.

BRIEF DESCRIPTION OF THE DRAWING

The drawing is a block diagram of an example of a system that includes an example of the device disclosed herein.

DETAILED DESCRIPTION

Elements of the drawing are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some case omitted from the drawing.

The drawing is a block diagram of an example of a system 10 that includes an example of the device disclosed herein, and accomplishes an example of the methods disclosed herein. System 10 is part of a motor vehicle which includes a motor vehicle cabin 30 that has sound transducers 32 and one or more microphones 34. The sound transducers are typically used, at least in part, for producing audio signals in cabin 30. Either existing audio system sound transducers or dedicated sound transducers can be used in system 10. The microphone or microphones can be used to detect sound in the cabin; such microphones can be used in an existing active sound management (ASM) system and/or can be part of the existing mobile telephone system 16, wherein they are located in motor vehicle cabin 30 and used to pick up the voice of the person using a hands-free telephone system. Mobile telephone system 16 includes system controller 18 and transceiver 20 that is operatively connected to transmitting and receiving antenna 22.

ASM system 12 includes ASM controller 14. System 12 communicates with audio head unit 50 that has audio head unit controller 52. System 12 also communicates with engine control system 60; engine control system 60 is an existing motor vehicle computer system that manages the operation of the engine and transmission. System 60 reports relevant data to system 12 that is useful to the vehicle's EHC or EHE system; such data may include, for example, RPM, throttle position, torque, gear and cylinder/hybrid/electric operational mode. Such signals can be used (along with cabin microphone signals) by an EHC system to generate engine harmonics-cancelling audio signals as disclosed in U.S. Pat. Nos. 8,194,873 and 8,280,073, the disclosures of which are incorporated herein by reference. Such signals can also be used by an EHE system to generate powertrain-enhancing audio signals as disclosed in U.S. Pat. No. 8,320,581 and US Patent Application Publication No. 20012/0177214, the disclosures of which are incorporated herein by reference.

Head unit controller 52 is typically the master device of a MOST network that is present in the motor vehicle. Typically, the MOST network uses a ring topology and synchronous data communication to transport audio, video, voice and data signals. The ring topology is not shown in the drawing but could be used. The network could have other configurations such as a star configuration, or could be enabled in manners other than MOST as would be apparent to those skilled in the field of automotive data networks.

ASM system 12 typically uses ASM controller 14 to control operation of sound transducers 32 so as to alter vehicle powertrain-related sounds in the cabin. The vehicle powertrain-related sounds are typically engine-related sounds and/or transmission-related sounds. ASM system 12 can accomplish engine harmonic reduction or cancellation wherein system 12 uses information from the engine (e.g., the engine RPM), that is typically derived from engine control system 60, along with microphones 34 located in the cabin, and continuously analyzes engine noise. System 12 then uses controller 14 that commands the vehicle's sound system to produce a signal that is acoustically opposite to the undesirable sound. This signal is provided to sound transducers 32 to effectively reduce the undesirable powertrain sounds. In the case of engine harmonic enhancement, the powertrain-related sounds are enhanced or altered so as to accomplish a desired result such as enhancing or modifying the spectrum of select powertrain sounds. For example, EHE can help create more linear sounds while mitigating or masking sound anomalies. EHE offers broad sound control.

Controller 52 is configured to receive from mobile telephone system 16 an indication that a mobile telephone call is incoming, or an indication that an outgoing call is being initiated. This indication is preferably accomplished by controller 18 communicating an appropriate signal to controller 52. After receipt of the indication that a call is incoming or outgoing, controller 52 is configured to command ASM controller 14 to cause operation of sound transducers 32 such that the level of vehicle powertrain-related sounds in cabin 30 is reduced. In this manner, controller 52 reduces powertrain-related sounds in cabin 30 when a telephone call is incoming or outgoing. The result is that the person making or receiving the call has a quieter environment and thus is better able to hear the call. Since the environment is quieter, there is also less powertrain-related sound picked up by the microphone that is configured to receive the user's voice as part of a mobile telephone call transmission; the call is thus clearer to the recipient. Another result is that the vehicle sound system is able to play back the telephone call at a lower volume, which prevents the system from having to drive the transducers beyond their normal physical limitations. Distortion and poor intelligibility are thus reduced or eliminated.

In a case where ASM system 12 is used as an EHC system, controller 52 may be configured to command controller 14 to enable sound transducers 32 so as to reduce or cancel powertrain-related sounds in the cabin. The result is that the EHC system can be turned on during a telephone call. Alternatively, when the motor vehicle EHC system is active by default to a particular power train noise target, when a call is initiated or received controller 52 can cause the transducers to refocus the noise reduction scheme. As one non-limiting example, during a call the EHC could be focused on a focal seating position. Or, there could be one default EHC setting for a normal driving condition, and a separate EHC setting that is enabled during a telephone call.

In a case where ASM system 12 is used as an EHE system, controller 52 may be configured to command controller 14 to either disable sound transducers 32 from enhancing powertrain-related sounds in the cabin, or at least to reduce the volume of enhancing sounds outputted by transducers 32. These sounds are typically engine harmonic sounds but need not be. The result is that the sound added by the EHE system is turned off or reduced during a telephone call.

System 10 may also include user-activated switch 54 that when activated sends a signal to controller 52. Switch 54 can be used when the user desires to quiet the cabin. Typically, this switch would cause controller 52 to either turn on an EHC system that reduces powertrain-related sounds in the cabin, or the switch may be used to fully turn off or at least reduce the audio output associated with an EHE system, both as described elsewhere herein. Switch 54 could alternatively or additionally be a telephone system switch that the user pushed or otherwise activated so as to send or receive a mobile telephone call, and which then enables controller 52 to reduce in-cabin powertrain sounds as described herein.

System 10 could be designed to reduce powertrain-related sounds at one or more desired or focal locations in vehicle cabin 30. The location could be the vehicle location that is designed for the presumed user of mobile telephone system 16. This may commonly be the driver's position, or in the case of a livery vehicle the VIP position which is usually in a rear seat. Alternatively, the powertrain active sound management system can be enabled to reduce powertrain-related sounds at more than one seat location, or the entire motor vehicle cabin.

The various features of the disclosure could be enabled in different manners than those described herein, and could be combined in manners other than those described herein.

What is claimed is:

1. A method comprising:
    receiving a first signal that indicates that an outgoing telephone call is being initiated; and
    in response to the first signal, generating a second signal that, when processed by a controller of an active sound management (ASM) system for a motor vehicle, where the ASM system is adapted to command a sound system of the motor vehicle to provide signals to a vehicle sound transducer, causes the ASM system to cause the sound transducer to begin to emit sound that reduces powertrain-related sounds at one or more seating positions within a cabin of the motor vehicle that includes a plurality of seating positions.

2. The method of claim 1, wherein the ASM system comprises an engine harmonic cancellation system that is set to a first powertrain noise target when the motor vehicle is in operation, and wherein the second signal causes the ASM system to reduce the powertrain-related sounds at the one or more seating positions from the first powertrain noise target to a second, different powertrain noise target.

3. The method of claim 1, wherein the ASM system comprises an engine harmonic enhancement (EHE) system, and wherein the second signal causes the ASM system to reduce or eliminate an amount of sound added by the EHE system at the one or more seating positions.

4. The method of claim 1, wherein the second signal, when processed by the controller of the ASM, causes the ASM system to cause one or more sound transducers in the cabin to begin to emit sound that reduces the powertrain-related sounds at a seating position of a driver of the motor vehicle.

5. The method of claim 1, wherein the second signal, when processed by the controller of the ASM, causes the ASM system to disable one or more sound transducers in the cabin from emitting sound that enhances engine harmonics at a driver's seating position within the cabin.

6. An audio head unit comprising:
    a controller operable to:
        receive a first signal that indicates the initiation of an outgoing telephone call; and
        in response to the first signal, generate a second signal that, when processed by a controller of an active sound management (ASM) system for a motor vehicle, where the ASM system is adapted to command a sound system of the motor vehicle to provide signals to a vehicle sound transducer, causes the ASM system to cause the sound transducer to begin to emit sound that reduces powertrain-related sounds at one or more seating positions within a cabin of the motor vehicle that includes a plurality of seating positions.

7. The audio head unit of claim 6, wherein the ASM system comprises an engine harmonic cancellation system that is set to a first powertrain noise target when the motor vehicle is in operation, and wherein the second signal causes the ASM system to reduce the powertrain-related sounds at the one or more seating positions from the first powertrain noise target to a second, different powertrain noise target.

8. The audio head unit of claim 6, wherein the ASM system comprises an engine harmonic enhancement (EHE) system, and wherein the second signal causes the ASM system to reduce or eliminate an amount of sound added by the EHE system at the one or more seating positions.

9. The audio head unit of claim 6, wherein the second signal, when processed by the controller of the ASM, causes the ASM system to cause one or more sound transducers in the cabin to begin to emit sound that reduces the powertrain-related sounds at a seating position of a driver of the motor vehicle.

10. The audio head unit of claim 6, wherein the second signal, when processed by the controller of the ASM, causes the ASM system to disable one or more sound transducers in the cabin from emitting sound that enhances engine harmonics at a driver's seating position within the cabin.

11. A system comprising:
    an active sound management (ASM) system for a motor vehicle where the ASM system is adapted to command a sound system of the motor vehicle to provide signals to a vehicle sound transducer;
    an audio head unit that includes a controller operable to:
        receive a first signal that indicates the initiation of an outgoing telephone call; and
        in response to the first signal, generate a second signal that, when processed by a controller of the ASM system, causes the ASM system to cause the sound transducer to begin to emit sound that reduces powertrain-related sounds at one or more seating positions within a cabin of the motor vehicle that includes a plurality of seating positions.

12. The system of claim 11, further comprising:
    a user-activated switch within the cabin of the motor vehicle, the user-activated switch being operable to generate a third signal that, when processed by the controller of the audio head unit, causes the controller of the audio head unit to generate a fourth signal that, when processed by the controller of the ASM system, causes the ASM system to cause the sound transducer to begin to emit sound that reduces powertrain-related sounds within the cabin of the motor vehicle.

13. The system of claim 11, further comprising:
a mobile telephone system operable to initiate outgoing telephone calls, and wherein the controller of the audio head unit is operable to receive the first signal from the mobile telephone system.

* * * * *